United States Patent
Peremarty et al.

(10) Patent No.: US 11,760,303 B2
(45) Date of Patent: Sep. 19, 2023

(54) INITIATOR FOR A GAS GENERATOR OF VEHICLE SAFETY DEVICE

(71) Applicant: AUTOLIV ASP, INC., Ogden, UT (US)

(72) Inventors: Francois Peremarty, Salt Lake City, UT (US); Ryan Mark Hubbard, Mendon, UT (US); Mason Wayment, Roy, UT (US); Jesse Guymon, Clinton, UT (US); Paul Robert Carver, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/233,582

(22) Filed: Apr. 19, 2021

(65) Prior Publication Data

US 2022/0332278 A1 Oct. 20, 2022

(51) Int. Cl.
*B60R 21/264* (2006.01)
*B60R 21/263* (2011.01)
*B60R 21/26* (2011.01)

(52) U.S. Cl.
CPC ........ *B60R 21/2644* (2013.01); *B60R 2021/26029* (2013.01)

(58) Field of Classification Search
CPC .................................................. B60R 21/2644
See application file for complete search history.

(56) References Cited

U.S. PATENT DOCUMENTS

| 333,655 A | * | 1/1886 | Michaelis | F42C 15/29 |
| | | | | 102/202.14 |
| 3,142,253 A | * | 7/1964 | Seavey | 102/202.14 |
| 3,211,097 A | * | 10/1965 | Foote | F42B 3/198 |
| | | | | 102/202.14 |
| 3,971,320 A | * | 7/1976 | Lee | F42B 3/103 |
| | | | | 102/202.9 |
| 4,402,269 A | * | 9/1983 | Smith | F42B 3/16 |
| | | | | 102/202.13 |
| 4,858,951 A | * | 8/1989 | Lenzen | C06B 33/12 |
| | | | | 102/288 |
| 5,005,486 A | * | 4/1991 | Lenzen | C06C 9/00 |
| | | | | 280/741 |

(Continued)

FOREIGN PATENT DOCUMENTS

CN 104567555 A 4/2015
EP 4122778 A1 1/2023

(Continued)

OTHER PUBLICATIONS

Office Action received in corresponding Japanese application No. JP 2022-048514, dated Mar. 8, 2023.

(Continued)

*Primary Examiner* — Barry Gooden, Jr.
(74) *Attorney, Agent, or Firm* — Harness, Dickey & Pierce, P.L.C.; Stephen T. Olson

(57) ABSTRACT

An initiator for a gas generator of a vehicle safety device includes a cup defining an interior, a primary pyrotechnic material disposed in the interior of the cup, and a secondary pyrotechnic material disposed in the interior of the cup. A separator member hermetically separates the primary pyrotechnic material from the secondary pyrotechnic material.

20 Claims, 5 Drawing Sheets

(56) References Cited

U.S. PATENT DOCUMENTS

| | | | | |
|---|---|---|---|---|
| 5,140,906 | A * | 8/1992 | Little, II | F42B 3/188 |
| | | | | 102/202.5 |
| 5,351,989 | A * | 10/1994 | Popek | B60R 21/272 |
| | | | | 280/740 |
| 5,403,036 | A * | 4/1995 | Zakula | F42B 3/103 |
| | | | | 422/166 |
| 5,447,105 | A * | 9/1995 | Bauer | F42B 3/04 |
| | | | | 280/740 |
| 5,596,163 | A * | 1/1997 | Caflisch | B60R 21/2644 |
| | | | | 102/202.7 |
| 5,621,183 | A * | 4/1997 | Bailey | F42B 3/18 |
| | | | | 102/202.7 |
| 5,844,164 | A * | 12/1998 | Cabrera | B60R 21/2644 |
| | | | | 102/288 |
| 5,939,660 | A * | 8/1999 | Fogle, Jr. | F42B 3/103 |
| | | | | 102/202.7 |
| 5,951,042 | A * | 9/1999 | O'Loughlin | B60R 21/2644 |
| | | | | 280/741 |
| 5,988,069 | A * | 11/1999 | Bailey | F42B 3/103 |
| | | | | 102/202.5 |
| 6,196,584 | B1 * | 3/2001 | Shirk | F16K 13/06 |
| | | | | 280/741 |
| 6,237,498 | B1 * | 5/2001 | Winterhalder | B60R 21/2644 |
| | | | | 280/741 |
| 6,412,817 | B2 * | 7/2002 | Patrickson | B60R 22/4628 |
| | | | | 102/202.1 |
| 6,474,684 | B1 * | 11/2002 | Ludwig | C06D 5/06 |
| | | | | 280/736 |
| 6,591,752 | B2 * | 7/2003 | Blomquist | C06B 31/00 |
| | | | | 149/19.8 |
| 6,615,735 | B2 * | 9/2003 | Enzmann | B60R 22/4628 |
| | | | | 280/743.1 |
| 6,644,206 | B2 * | 11/2003 | Fogle, Jr. | F42B 3/18 |
| | | | | 280/741 |
| 7,267,056 | B2 * | 9/2007 | Takahara | F42B 3/103 |
| | | | | 280/741 |
| 7,466,532 | B2 * | 12/2008 | Nishimura | F42B 3/124 |
| | | | | 361/251 |
| 9,738,245 | B1 | 8/2017 | Stevens | |
| 10,760,880 | B2 * | 9/2020 | Boutin | F42B 3/11 |
| 2002/0189487 | A1 | 12/2002 | Kubo et al. | |
| 2004/0212184 | A1 | 10/2004 | Canterberry et al. | |
| 2010/0320735 | A1 * | 12/2010 | Duvacquier | B60R 21/2644 |
| | | | | 280/741 |
| 2011/0083576 | A1 * | 4/2011 | Patton | B60R 21/239 |
| | | | | 102/530 |
| 2012/0217728 | A1 | 8/2012 | Jackson et al. | |

FOREIGN PATENT DOCUMENTS

| | | | | |
|---|---|---|---|---|
| GB | 2281608 A | * | 3/1995 | B01J 7/00 |
| JP | 2003-285712 A | | 10/2003 | |
| JP | 2005155968 A | * | 6/2005 | |
| JP | 2007-225160 A | | 9/2007 | |
| JP | 2013-166496 A | | 8/2013 | |
| JP | 2022165390 A | | 10/2022 | |

OTHER PUBLICATIONS

Chinese Office Action regarding Patent Application No. 202210315811.5, dated Jun. 17, 2023.

* cited by examiner

INITIATOR FOR A GAS GENERATOR OF VEHICLE SAFETY DEVICE

FIELD

The present disclosure generally concerns initiators for gas generators of vehicle safety devices such as inflatable airbags and pretensioned seatbelts. More particularly, the present disclosure relates to an initiator for a gas generator having a primary pyrotechnic material that is hermetically separated from a secondary pyrotechnic material.

BACKGROUND

This section provides background information related to the present disclosure which is not necessarily prior art.

Inflatable occupant restraint systems, including airbags, are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components. Side airbags may also be carried by a vehicle seat.

Inflator devices are employed to produce or supply inflation gas for inflating an inflatable airbag in the event of a collision. The inflator devices for such applications often include a gas generant material stored within the housing of the inflator device and an initiator to actuate the gas generant material when a sensor within the vehicle senses an accident condition (e.g., measures abnormal deceleration). Actuation of the gas generant material triggers inflation of the airbag within a few milliseconds with the produced gas. The inflated airbag cushions the vehicle occupant from impact forces. Initiators are also used for the pretensioning of seatbelts.

Initiators may commonly have a first or primary pyrotechnic material and a second or secondary pyrotechnic material. The primary pyrotechnic material is ignited by an electrical signal and in turn ignites the secondary pyrotechnic material. Heat from combustion of the secondary pyrotechnic material ignites gas generant material of the inflator device to produce inflation gases for an airbag.

While known initiators for inflatable occupant restraints have generally proven to be suitable for their intended uses, a continuous need for improvement in the relevant art remains. In these regards, it is desirable to eliminate or minimize performance shifts of an initiator that may result from chemical incompatibility between primary and secondary pyrotechnic materials.

SUMMARY

This section provides a general summary of the disclosure and is not a comprehensive disclosure of its full scope or all of its features.

It is one general object of the present teachings to provide an initiator for a gas generator of a vehicle safety device that hermetically separates a primary pyrotechnic material from a secondary pyrotechnic material.

In accordance with one particular aspect, the present teachings provide an initiator for a gas generator of a vehicle safety device which includes a cup defining an interior, a primary pyrotechnic material disposed in the interior of the cup, and a secondary pyrotechnic material disposed in the interior of the cup. A separator member hermetically separates the primary pyrotechnic material from the secondary pyrotechnic material.

In accordance with another particular aspect, the present teachings provide an initiator for a gas generator of a vehicle safety device. The initiator includes a cup, a base member, and a separator member. The cup defines an interior and includes a closed end, an open end, and a cylindrical sidewall extending therebetween. The base member is at least partially disposed in the cup. The base member includes an axially extending opening having a portion containing a first pyrotechnic material. The cylindrical sidewall of the cup is attached to the base member about a circumference of the base member. A second pyrotechnic material is disposed in the interior of the cup. The separator member is attached to the base member and closes one end of the axially extending opening to hermetically separate the first pyrotechnic material from the second pyrotechnic material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
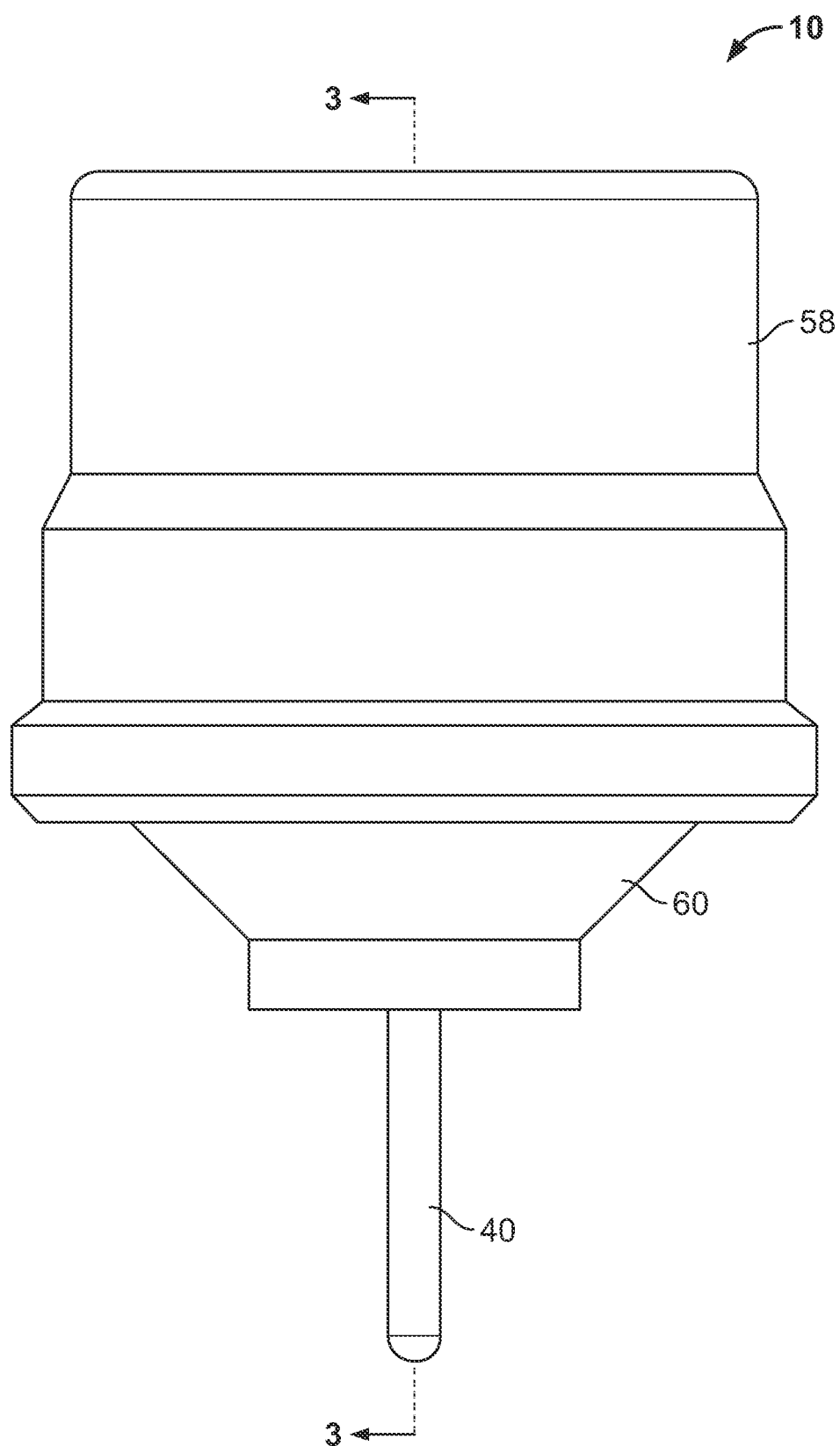
FIG. 1 is a side view of an initiator for a gas generator of a vehicle occupant restraint in accordance with the present teachings.
Figure 2:
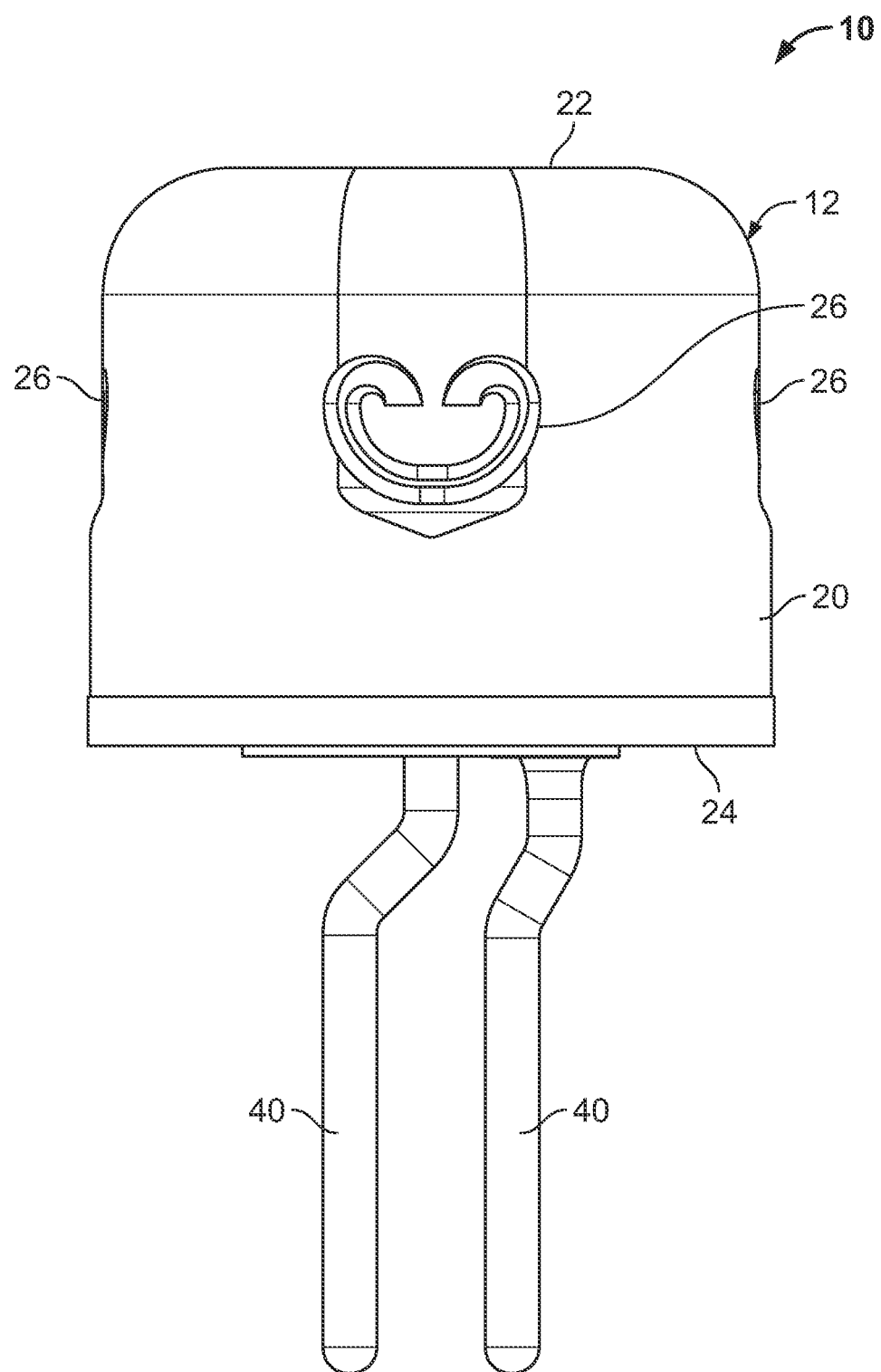
FIG. 2 is another side of the initiator for a gas generator in accordance with the present teachings, the initiator shown rotated 90 degrees about its axis and an insulated resistance cover of the initiator shown removed for purposes of illustration.
Figure 3:
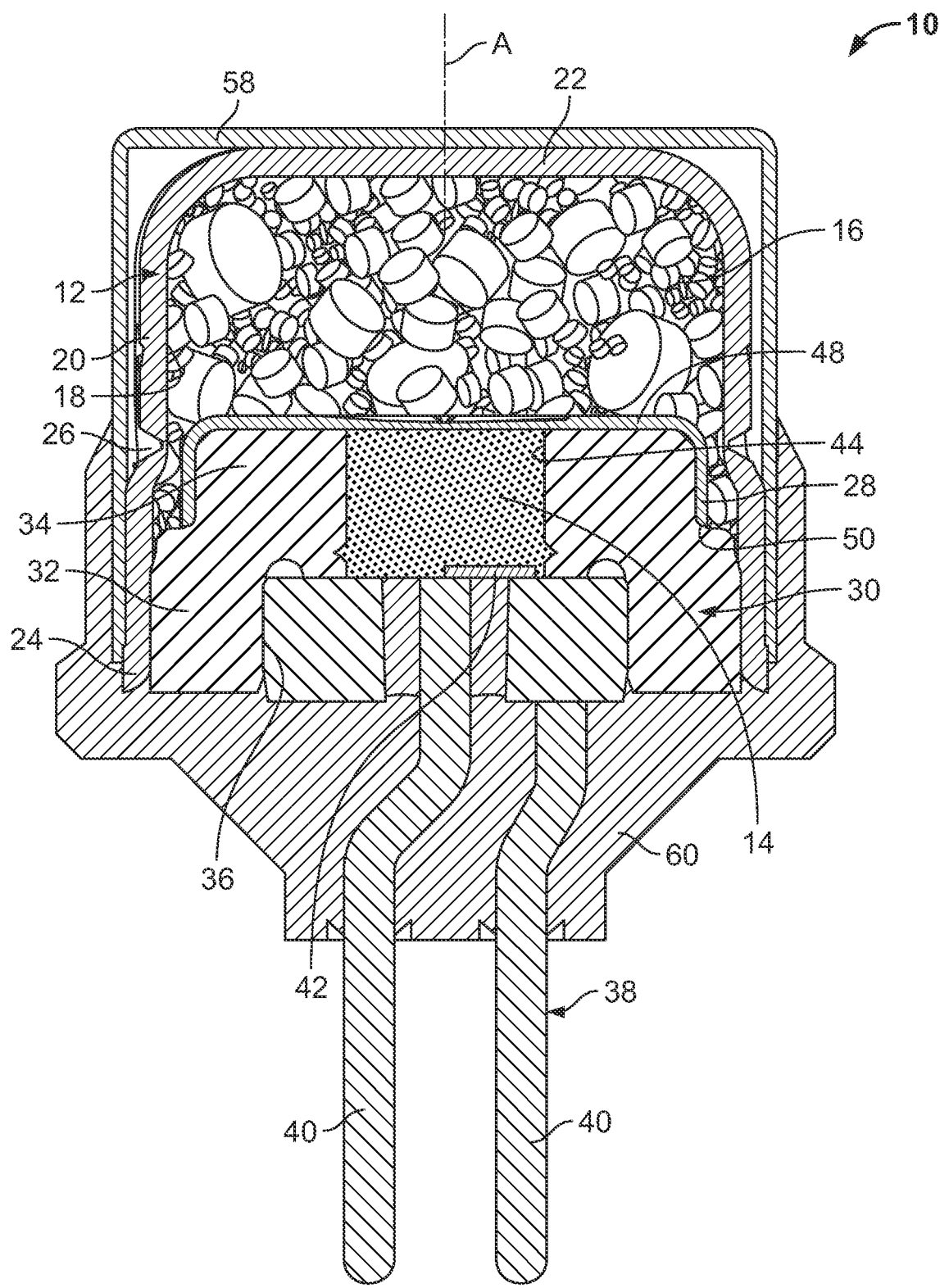
FIG. 3 is a cross-sectional view taken along the line 3-3 of FIG. 1.

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

With reference to drawings, an initiator for a gas generator of a vehicle safety device in accordance with the present teachings is illustrated and generally identified at reference character 10. The initiator 10 may be part of an occupant restraint system of a motor vehicle that includes a gas generator and an inflatable airbag (not particularly shown), for example. The particular inflator or pyrotechnical inflator 10 shown in the drawings is particularly adapted for a driver side front airbag of an occupant restraint system. It will be understood, however, that the initiator described herein can be used in many other pyrotechnical devices within the scope of the present teachings. It will be understood, however, that various aspects of the present teachings may be readily adapted for use with other airbags or with seatbelt pretensioners.

The initiator 10 is generally illustrated to include a cup or case 12, a first or primary pyrotechnic material, and a second or secondary pyrotechnic material 16. The primary and secondary materials are disposed or stored in an interior 18 of the cup 12. The cup 12 includes a cylindrical sidewall 20 and a circular base. The cylindrical sidewall 20 that extends along an axis A of the initiator 10 between a closed end 22 and an open end 24. The cup 12 may be formed of metal and may be formed by cold striking. In one particular example, the cup 12 may be formed by stamping a sheet of nickeled steel, such as DC04 or DC06 and may have a thickness between 0.3 and 0.6 mm.

The cup 12 is preferably formed to include a plurality of weakened zones 26. As will become more fully understood below, the weakened zones 26 of the cup 12 open in response to a pressure from within the cup 12 generated by combustion of the secondary pyrotechnic material 16. In the embodiment illustrated, the sidewall 20 includes four weakened zones 26 uniformly distributed around the axis A. The plurality of weakened zones 26 can be varied in configuration or number within the scope of the present teachings.

In the embodiment illustrated, the first pyrotechnic material 14 is distinct from the secondary pyrotechnic material 16. The primary pyrotechnic material 14 may be separated from the secondary pyrotechnic material 16 within the interior 18 of the cup 12 by a separator member 28. The primary pyrotechnic material 14 may be in the form of a slurry. The secondary pyrotechnic material 16 may be a granulated material, including but not limited to a boron based material. It will be understood the particular pyrotechnic materials are outside of the scope of the present teachings and may be selected from various pyrotechnic materials well known in the art.

The initiator 10 of the present teachings may further include an adaptor or base member 30. The adaptor 30 functions to contain the first pyrotechnic material 14 and to provide an interface between the cup 12 and the separator member 28. The adaptor 30 may be formed of stainless steel or other suitable material. One suitable material is Type 304L stainless steel. The adaptor 30 is cylindrical in shape and includes a stepped configuration having a first or lower portion 32 and a second or upper portion 34. The first portion 32 has a first diameter and the second portion 34 has a smaller, second diameter.

The adaptor 30 is at least partially disposed in the cup 12. As shown, the adaptor 30 is completely or substantially completely disposed in the cup 12. The adaptor 30 is sized to be received within the open end 24 of the cup 12. The cylindrical sidewall 20 of the cup 12 may be attached to the adaptor 30 about a circumference of the adaptor 30. In the embodiment illustrated, the first portion 32 of the adaptor 30 may be welded to the cup 12.

The first portion 32 of the adaptor 30 defines a central opening 36 that receives an ignition device 38. The ignition device 38 conventionally includes a pair of electrical connectors or pins 40 and a bridge wire 42. The pair of electrical pins 40 are in reaction initiating communication with the first pyrotechnic material 14 through the bridge wire 42. In this regard, an electrical current delivered to the pins 40 will serve to melt the bridge wire 42 and ignite the first pyrotechnic material 14.

The second portion 34 of the adaptor 30 defines a central cavity 44. The cavity 44 contains the primary pyrotechnic material 14. The cavity has an open end that is closed by the separator member 28. The separator member 28 hermetically separates the primary pyrotechnic material 14 from the secondary pyrotechnic material 16. As used herein, the term "hermetically" describing the separation between the primary and secondary pyrotechnic materials 14 and 16 shall mean that the primary and secondary materials 14 and 16 are completely sealed from one another. The hermetic seal between the primary pyrotechnic material 14 and the secondary pyrotechnic material 16 provides a mechanical separation that eliminates or substantially eliminates any chemical incompatibility between the primary pyrotechnic material 14 from the secondary pyrotechnic material 16 that may otherwise degrade or shift performance of the initiator 10.

Figure 4:
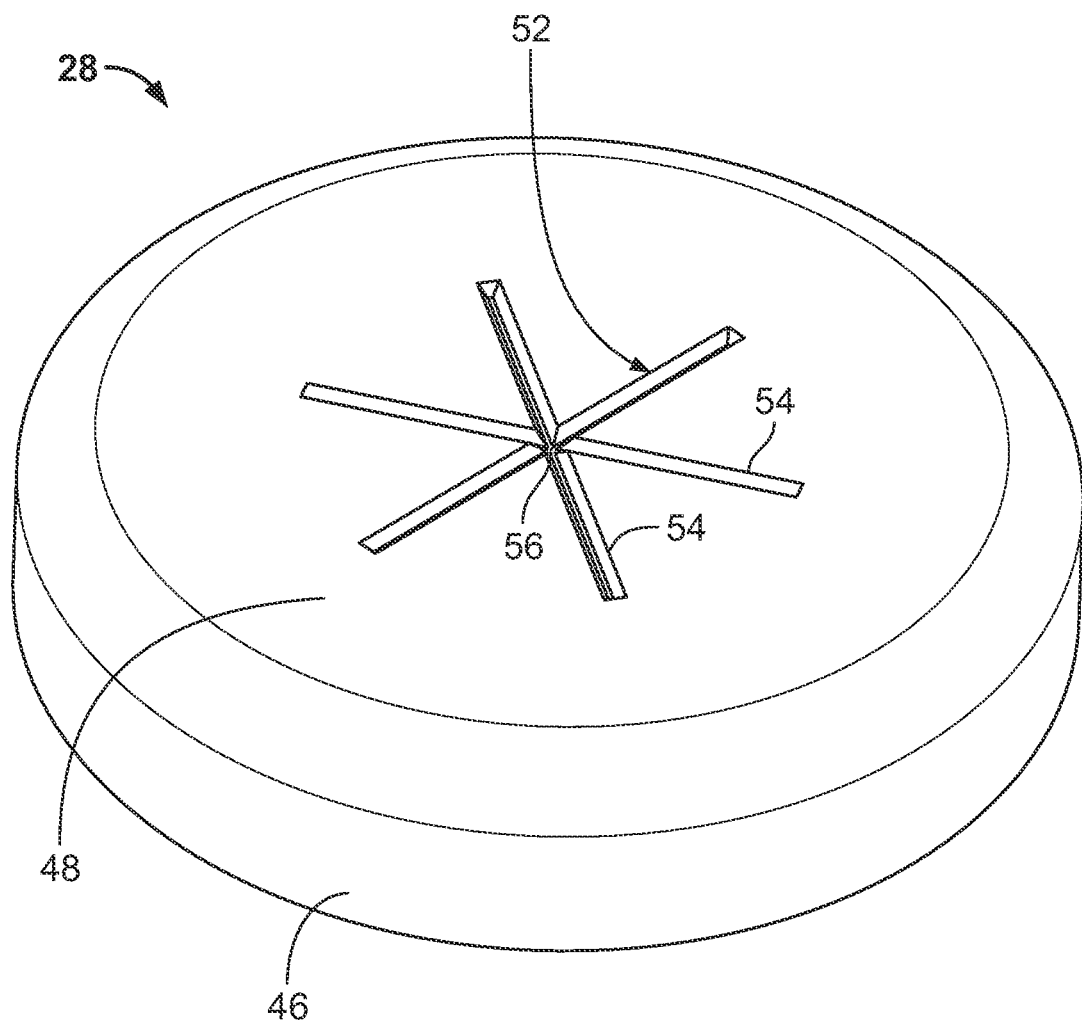
FIG. 4 is a top and side perspective view of a separator member of the initiator removed from the initiator for purposes of illustration.
Figure 5:
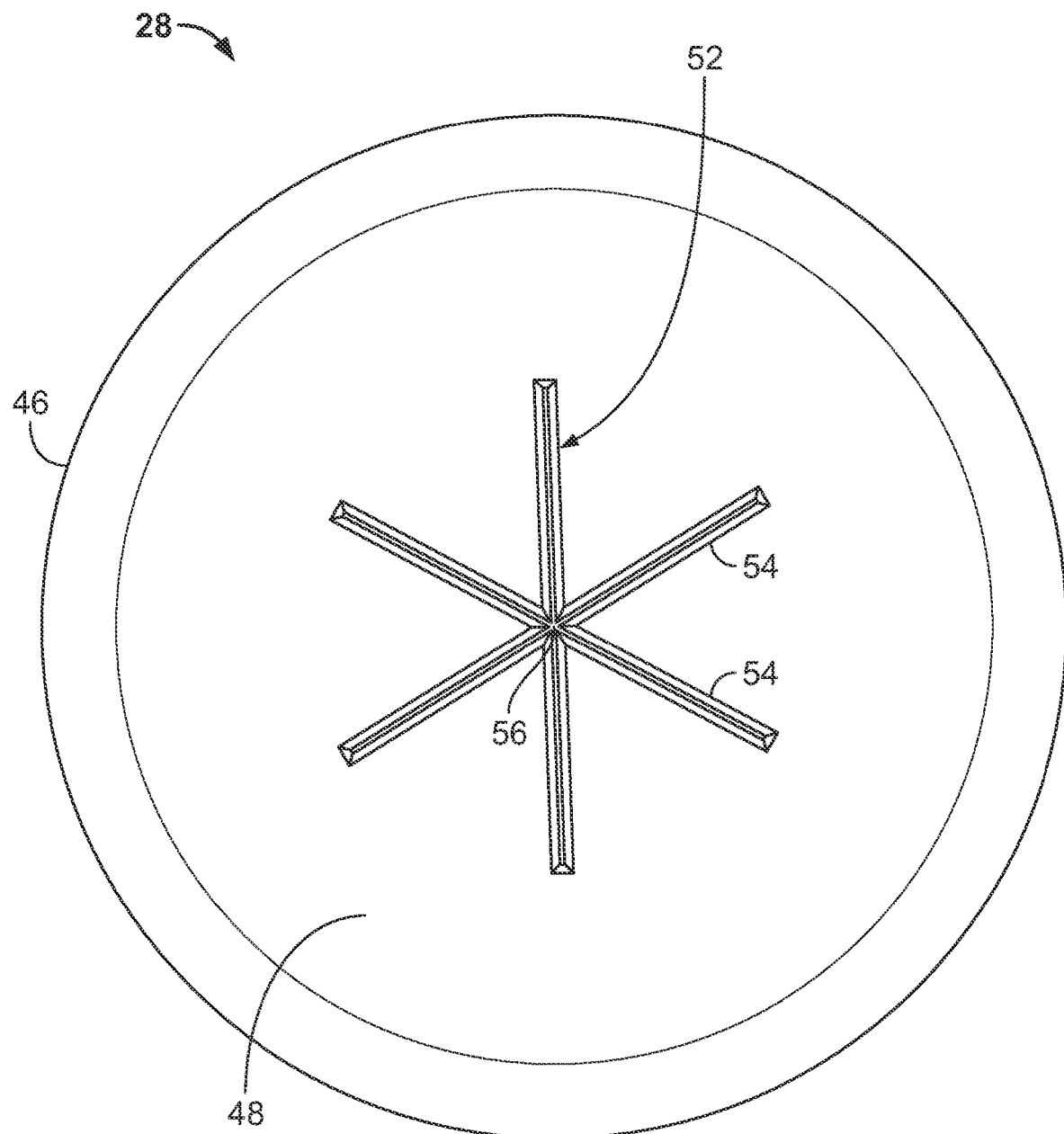
FIG. 5 is a top view of the separator member of FIG. 4.

As particularly shown in FIGS. 4 and 5, the separator member 28 includes a cylindrical sidewall 46. The cylindrical sidewall 48 extends along the axis A of the initiator 10 between a closed end 48 and an open end 50. The closed end 48 defines a disk-shaped portion. The separator member 28 may be formed of metal and may be formed by cold striking. In one particular example, the separator member 28 may be formed by stamping a sheet of stainless steel. The cylindrical sidewall 46 of the separator member 28 may be welded or otherwise securely attached to the second portion 34 of the adaptor 30. While the separator member 28 is shown and described as being cylindrical, the separator member may alternatively be disk only in shape (i.e., not including the sidewall 46). With such an alternative shape, the separator member 28 may be welded or otherwise suitably attached to the upper axial end of the second portion 34 of the adapter 30.

The closed end or disk-shaped portion 48 of the separator member 28 may be formed to include a weakened zone 52. The weakened zone 52, which may be stamped into the disk-shaped portion 48, is configured to open in response to a pressure in the cavity 44 of the adapter 30 generated by combustion of the first pyrotechnic material 14. In the embodiment illustrated, the weakened zone 52 includes a plurality of radially extending arms 54. The arms 54 are shown to originate from a common point 56 at a radial center of the disk-shaped portion 48. The configuration of the weakened zone 52 may vary within the scope of the present teaching.

The initiator 28 of the present teachings is shown to further include an insulated resistance cover or static cover 58 and an elastomeric overmolding or overmolded member 60. These elements 58 and 60 will be understood to be conventional insofar as the present invention is concerned. Briefly, the overmolded member 60 may be an injection mold of a glass filled nylon 6 material. The static cover 58 may be constructed of nylon 6 or other plastic material.

In use, an electrical current is delivered to the pins 40 of the ignition device 38. The current melts the bridge wire 42 that in turn ignites the primary pyrotechnic material 14. Ignition of the primary pyrotechnic material 14 creates a pressure within the chamber 44 of the adaptor 30 which opens the weakened zone 52 of the separator member 28. Heat from the ignition of the primary pyrotechnic material 14 is vented through the opened weakened zone and ignites the secondary pyrotechnic material 16. Pressure from combustion of the secondary pyrotechnic material 16 opens the weakened zones 26 of the cup 12.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. An initiator for a gas generator of a vehicle safety device, the initiator comprising:
   a cup defining an interior;
   a primary pyrotechnic material disposed in the interior of the cup;
   a secondary pyrotechnic material disposed in the interior of the cup;
   a separator member hermetically separating the primary pyrotechnic material from the secondary pyrotechnic material;
   a pair of electrical pins and a bridge wire, the bridge wire in direct contact with the primary pyrotechnic material of the initiator, the pair of electrical pins in reaction initiating communication with the primary pyrotechnic material through the bridge wire, and
   an adaptor at least partially disposed in the interior of the cup, the adaptor holding the primary pyrotechnic material, the separator member connected to the cup through the adaptor
   wherein the primary pyrotechnic material directly contacts a first side of the separator member and the secondary pyrotechnic material directly contacts a second side of the separator member, and
   wherein the adaptor includes a central opening including a first portion containing the primary pyrotechnic material.

2. The initiator of claim 1, wherein the separator member includes a weakened zone configured to open in response to ignition of the primary pyrotechnic material.

3. The initiator of claim 1, wherein the separator member is constructed of metal.

4. The initiator of claim 1, wherein the separator member includes a cylindrical sidewall extending from a disk-shaped portion, the cylindrical sidewall circumferentially surrounding a portion of the adaptor.

5. The initiator of claim 1, wherein the cup includes a closed end and an open end, the cup having a cup sidewall secured to the separator member proximate the open end of the cup.

6. The initiator of claim 1, wherein the adaptor, the cup and the separator member are each constructed of metal and the cup is welded to the adaptor and the separator member is welded to the adaptor and further wherein the adaptor is cylindrical in shape, the cup welded to the adaptor proximate a first axial end of the adaptor and the separator member welded to the adaptor proximate a second axial end of the adaptor.

7. The initiator of claim 1, wherein the adaptor defines a cavity receiving the primary pyrotechnic material.

8. The initiator of claim 1, wherein the adaptor includes a first axial end with a first outer diameter and a second axial end with a second outer diameter, the second outer diameter being greater than the first outer diameter, the separator member secured directly to the first outer diameter, the cup secured directly to the second outer diameter.

9. The initiator of claim 1, wherein the cup defines an open axial end and a closed axial end, the separator member disposed in the cup completely between the open axial end and the closed axial end.

10. The initiator of claim 1, wherein the adaptor includes an upper axial end, the central opening open at the upper axial end, the separator member abutting the upper axial end to close the central opening.

11. The initiator of claim 1, wherein the separator member is formed separate from the cup and spaced from the cup.

12. The initiator of claim 1, wherein the interior of the cup includes a first axial portion adjacent to a closed end of the cup and a second axial portion adjacent to an open end of the cup, the first axial portion filled with the secondary pyrotechnic material, and wherein the initiator further includes the adaptor at least partially disposed in the second axial portion of the interior of the cup, the adaptor holding the primary pyrotechnic material, the separator member secured to the adaptor.

13. A initiator for a gas generator of a vehicle safety device, the initiator comprising:
   a cup defining an interior, the cup including a closed end, an open end, and a cylindrical sidewall extending therebetween;
   a base member at least partially disposed in the cup, the base member including an axially extending opening, the axially extending opening having a portion containing a first pyrotechnic material, the cylindrical sidewall of the cup attached to the base member about a circumference of the base member;
   a second pyrotechnic material disposed in the interior of the cup;
   a separator member attached to the base member and closing one end of the axially extending opening to hermetically separate the first pyrotechnic material from the second pyrotechnic material;
   a pair of electrical pins and a bridge wire, the bridge wire in direct contact with the first pyrotechnic material of the initiator, the pair of electrical pins in reaction initiating communication with the first pyrotechnic material through the bridge wire, and
   an adaptor at least partially disposed in the interior of the cup, the adaptor holding the first pyrotechnic material, the separator member connected to the cup through the adaptor, wherein the primary pyrotechnic material directly contacts a first side of the separator member and the second pyrotechnic material directly contacts a second side of the separator member, and wherein the adaptor has and opening containing the primary pyrotechnic material.

14. The initiator of claim 13, wherein the second pyrotechnic material is axially between the separator member and the closed end of the cup.

15. The initiator of claim 13, wherein the separator member is welded to a first axial end of the base member.

16. The initiator of claim 13, wherein the separator member is constructed of metal.

17. The initiator of claim 13, wherein the base member, the cup and the separator member are each constructed of metal and wherein the cup is welded to the base member and the separator member is welded to the base member.

18. The initiator of claim 13, wherein the interior of the cup includes a first axial portion adjacent to a closed end of the cup and a second axial portion adjacent to an open end of the cup, the first axial portion filled with the second pyrotechnic material, and wherein the initiator further includes the adaptor at least partially disposed in the second axial portion of the interior of the cup, the adaptor holding the first pyrotechnic material, the separator member secured to the adaptor.

19. An initiator for a gas generator of a vehicle safety device, the initiator comprising:
   a cup defining an interior;
   a primary pyrotechnic material disposed in the interior of the cup;
   a secondary pyrotechnic material disposed in the interior of the cup;
   a separator member hermetically separating the primary pyrotechnic material from the secondary pyrotechnic material;
   a pair of electrical pins and a bridge wire, the bridge wire in direct contact with the primary pyrotechnic material of the initiator, the pair of electrical pins in reaction initiating communication with the primary pyrotechnic material through the bridge wire; and
   an adaptor disposed in the interior of the cup, the adaptor including an upper portion radially surrounding the primary pyrotechnic material,
   wherein the primary pyrotechnic material directly contacts a first side of the separator member and the secondary pyrotechnic material directly contacts a second side of the separator member.

20. The initiator of claim 19, wherein the separator member includes a planar disk shaped portion flush against an upper surface of the adaptor, the disk shaped portion closing an opening in the adaptor containing the primary pyrotechnic material.

* * * * *